(12) United States Patent
Tanaka et al.

(10) Patent No.: US 10,849,015 B2
(45) Date of Patent: Nov. 24, 2020

(54) COMMUNICATION APPARATUS AND COMMUNICATION METHOD

(71) Applicant: SONY CORPORATION, Tokyo (JP)

(72) Inventors: Yusuke Tanaka, Tokyo (JP); Shigeru Sugaya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/336,262

(22) PCT Filed: Aug. 16, 2017

(86) PCT No.: PCT/JP2017/029480
§ 371 (c)(1),
(2) Date: Mar. 25, 2019

(87) PCT Pub. No.: WO2018/079015
PCT Pub. Date: May 3, 2018

(65) Prior Publication Data
US 2019/0246314 A1 Aug. 8, 2019

(30) Foreign Application Priority Data
Oct. 24, 2016 (JP) .................. 2016-208179

(51) Int. Cl.
H04W 28/06 (2009.01)
H04W 84/12 (2009.01)
H04W 72/04 (2009.01)

(52) U.S. Cl.
CPC .......... H04W 28/06 (2013.01); H04W 72/04 (2013.01); H04W 72/0406 (2013.01); H04W 84/12 (2013.01)

(58) Field of Classification Search
None
See application file for complete search history.

(56) References Cited

U.S. PATENT DOCUMENTS

2007/0150732 A1* 6/2007 Suzuki .................. H04W 12/06
713/168
2008/0298333 A1 12/2008 Seok
(Continued)

FOREIGN PATENT DOCUMENTS

AU 2015384676 A1 7/2017
CA 2557128 A1 2/2007
(Continued)

OTHER PUBLICATIONS

Extended European Search Report of EP Application No. 17865942.1, dated Aug. 27, 2019, 09 pages.
(Continued)

Primary Examiner — Diane L Lo
(74) Attorney, Agent, or Firm — Chip Law Group

(57) ABSTRACT

To provide an excellent communication apparatus and communication method which operates with a basic service set belonging to an extended service set. A wireless terminal transmits a frame in which BSS-color and ESS-color which respectively identify a BSS and an ESS to which the own wireless terminal belongs are described. Further, part of a region for storing ESS-color is used as a region for storing BSS-color to secure the number of pieces of BSS-color sufficient to avoid overlapping. An STA stores statistical information regarding a received frame in association with BSS-color and ESS-color and performs cooperative operation within the ESS or between the ESSs.

19 Claims, 10 Drawing Sheets

(56) References Cited

U.S. PATENT DOCUMENTS

| | | | |
|---|---|---|---|
| 2011/0040969 A1 | 2/2011 | Yao et al. | |
| 2016/0302122 A1 | 10/2016 | Masini et al. | |
| 2017/0041952 A1* | 2/2017 | Kim | H04W 74/08 |
| 2017/0257817 A1 | 9/2017 | Itagaki et al. | |
| 2018/0027573 A1* | 1/2018 | Cariou | H04W 72/085 |
| | | | 370/329 |
| 2018/0063718 A1* | 3/2018 | Lan | H04W 16/10 |
| 2018/0184285 A1* | 6/2018 | Patil | H04L 61/2038 |
| 2018/0288665 A1 | 10/2018 | Masini et al. | |

FOREIGN PATENT DOCUMENTS

| | | | |
|---|---|---|---|
| CN | 101682539 A | | 3/2010 |
| CN | 102484840 A | | 5/2012 |
| CN | 107690828 A | | 2/2018 |
| EP | 1758303 A1 | | 2/2007 |
| EP | 2468045 A2 | | 6/2012 |
| EP | 3281456 A1 | | 2/2018 |
| JP | 2010-529730 A | | 8/2010 |
| JP | 2011-044894 A | | 3/2011 |
| JP | 5348726 B2 | | 11/2013 |
| JP | 2014-207693 A | | 10/2014 |
| KR | 10-2009-0132650 A | | 12/2009 |
| KR | 10-2012-0089807 A | | 8/2012 |
| RU | 2012110171 A | | 9/2013 |
| TW | 200915783 A | | 4/2009 |
| TW | 201136380 A | | 10/2011 |
| WO | 2008/140325 A2 | | 11/2008 |
| WO | 2008/147130 A2 | | 12/2008 |
| WO | 2011/022171 A2 | | 2/2011 |
| WO | 2016/136116 A1 | | 9/2016 |
| WO | 2016/163928 A1 | | 10/2016 |

OTHER PUBLICATIONS

Diepstraten, et al., "Draft Inter Access Point Protocol (IAPP) Specification", IEEE 80211 Wireless Access Method and Physical Specification, Document: IEEE P802.11-96/108, Jul. 1996, 24 pages.

"Remaining Issues of Downlink Control Signalling for CoMP", Alcatel-Lucent, Alcatel-Lucent Shanghai Bell, 3GPP TSG RAN WG1 Meeting #70, Qingdao, China, R1-123142, Aug. 13-17, 2012, 04 pages.

"Remaining Issues of Downlink Control Signalling for CoMP", 3GPP TSG RAN WG1 Meeting #70, Qingdao, China, R1-123142, Aug. 13-17, 2012, 04 pages.

International Search Report and Written Opinion of PCT Application No. PCT/JP2017/029480, dated Nov. 7, 2017, 09 pages of ISRWO.

"Remaining Issues of Downlink Control Signalling for CoMP", Alcatel-Lucent Shanghai Bell, 3GPP TSG RAN WG1 Meeting #70, Qingdao, China, R1-123142, Aug. 13-17, 2012, 04 pages.

* cited by examiner

COMMUNICATION APPARATUS AND COMMUNICATION METHOD

CROSS REFERENCE TO RELATED APPLICATIONS

This application is a U.S. National Phase of International Patent Application No. PCT/JP2017/029480 filed on Aug. 16, 2017, which claims priority benefit of Japanese Patent Application No. JP 2016-208179 filed in the Japan Patent Office on Oct. 24, 2016. Each of the above-referenced applications is hereby incorporated herein by reference in its entirety.

TECHNICAL FIELD

The technology disclosed in the present specification relates to a communication apparatus which operates in a basic service set belonging to an extended service set, and a communication method.

BACKGROUND ART

In an infrastructure mode of a wireless LAN typified by IEEE 802.11, or the like, a basic service set (BSS) includes one access point (AP) and one or more subordinate client terminals (STAs), and further, an extended service set (ESS) includes a plurality of BSSs. The BSS is identified with a network identifier which is called a BSSID, which has 48 bits, and which is normally the same as a MAC address of the AP. Further, while alphanumerical characters up to 32 characters can be set as a network identifier ESSID for identifying the ESS, it is necessary to set the same ESSID at respective devices (the APs and the STAs) constituting the ESS.

It is assumed that a wireless terminal apparatus transmits a frame to which, for example, information regarding a BSS as a first network group to which the own wireless terminal apparatus belongs, is added as an identifier. Further, it is assumed that the identifier of the BSS is stored in a physical header at the beginning of the frame so that a wireless terminal belonging to another group can determine reception processing of frames early (see, for example, Patent Literature 1).

CITATION LIST

Patent Literature

Patent Literature 1: JP 2014-207693A
Patent Literature 2: JP 2011-44894A

DISCLOSURE OF INVENTION

Technical Problem

An object of the technology disclosed in the present specification is to provide an excellent communication apparatus and communication method which enables preferable operation with a basic service set belonging to an extended service set.

Solution to Problem

The technology disclosed in the present specification has been devised in light of the problem described above, a first aspect thereof is a communication apparatus that transmits a frame in which a first identifier regarding a first network group to which an own communication apparatus belongs and a second identifier regarding a second network group to which the first network group belongs are stored.

According to a second aspect of the technology disclosed in the present specification, the communication apparatus according to the first aspect is configured to store the first identifier and the second identifier in a physical header of the frame, and perform transmission.

According to a third aspect of the technology disclosed in the present specification, the communication apparatus according to the second aspect is also configured to store the second identifier within a signal region in the physical header, in which the first identifier is stored, and perform transmission.

According to a fourth aspect of the technology disclosed in the present specification, the communication apparatus according to the third aspect is configured to store the second identifier in a region which is newly added within the signal region, and perform transmission.

According to a fifth aspect of the technology disclosed in the present specification, the communication apparatus according to the third aspect is configured to store, when it is necessary to make a notification of the second identifier, the second identifier within an existing region for storing other information within the signal region, and perform transmission.

According to a sixth aspect of the technology disclosed in the present specification, the communication apparatus according to the fifth aspect is configured to indicate whether or not the second identifier is stored in the existing region within the signal region.

According to a seventh aspect of the technology disclosed in the present specification, the communication apparatus according to the fifth aspect is configured to store, when it is necessary to make a notification of the second identifier, the second identifier within an existing region for storing other information within the signal region, and perform transmission.

According to an eighth aspect of the technology disclosed in the present specification, the communication apparatus according to the second aspect is configured to store the second identifier in a second signal region within the physical header, and perform transmission, the second signal region being different from a signal region in which the first identifier is stored and being newly added.

According to a ninth aspect of the technology disclosed in the present specification, the communication apparatus according to the first aspect is configured to store the first identifier in a physical header of the frame, store the second identifier in a region after the physical header, and perform transmission, the region being able to be decoded independently of a payload region.

According to a tenth aspect of the technology disclosed in the present specification, the communication apparatus according to the first aspect is configured to store the first identifier in a physical header of the frame, store the second identifier in a payload region, and perform transmission.

According to an eleventh aspect of the technology disclosed in the present specification, the communication apparatus according to the first aspect is configured to make extension of the first identifier made possible by storing part of the first identifier in part of a region for storing the second identifier.

According to a twelfth aspect of the technology disclosed in the present specification, the communication apparatus according to the eleventh aspect is also configured to transmit information for making a notification that the extension is performed.

According to a thirteenth aspect of the technology disclosed in the present specification, the communication apparatus according to the eleventh aspect is configured to perform the extension on the basis of the number of surrounding first network groups.

In addition, a fourteenth aspect of the technology disclosed in the present specification is a communication apparatus that stores information regarding a received frame in which a first identifier regarding a first network group and a second identifier regarding a second network group to which the first network group belongs are described, in accordance with the first identifier or the second identifier.

According to a fifteenth aspect of the technology disclosed in the present specification, the communication apparatus according to the fourteenth aspect is configured to transmit the stored information in accordance with the first identifier or the second identifier.

In addition, a sixteenth aspect of the technology disclosed in the present specification is a communication apparatus that receives from a subordinate wireless terminal information regarding a received frame in which a first identifier regarding a first network group and a second identifier regarding a second network group to which the first network group belongs are described, in accordance with the first identifier or the second identifier.

According to a seventeenth aspect of the technology disclosed in the present specification, the communication apparatus according to the sixteenth aspect is configured to perform cooperative operation with at least one of a communication apparatus within another first network group included in a second network group to which an own communication apparatus belongs or a communication apparatus within a second network group to which the own communication apparatus does not belong, on the basis of the information received from the wireless terminal.

In addition, an eighteenth aspect of the technology disclosed in the present specification is a communication method including: a step of transmitting a frame in which a first identifier regarding a first network group to which an own communication apparatus belongs and a second identifier regarding a second network group to which the first network group belongs are stored.

In addition, a nineteenth aspect of the technology disclosed in the present specification is a communication method including: a step of storing information regarding a received frame in which a first identifier regarding a first network group and a second identifier regarding a second network group to which the first network group belongs are described, in accordance with the first identifier or the second identifier.

In addition, a twentieth aspect of the technology disclosed in the present specification is a communication method including: a step of receiving from a subordinate wireless terminal information regarding a received frame in which a first identifier regarding a first network group and a second identifier regarding a second network group to which the first network group belongs are described, in accordance with the first identifier or the second identifier.

Advantageous Effects of Invention

According to the technology disclosed in the present specification, it is possible to provide an excellent communication apparatus and communication method which enables preferable operation with a basic service set belonging to an extended service set.

Note that the effects described in the present specification are merely examples, and effects of the present invention are not limited to these. Further, there is also a case where the present invention further provides additional effects other than the above-described effects.

Other objects, features and advantages of the technology disclosed in the present specification will become more clear from the detailed description based on an embodiment which will be described later and the accompanying drawings.

MODE(S) FOR CARRYING OUT THE INVENTION

Figure 1:
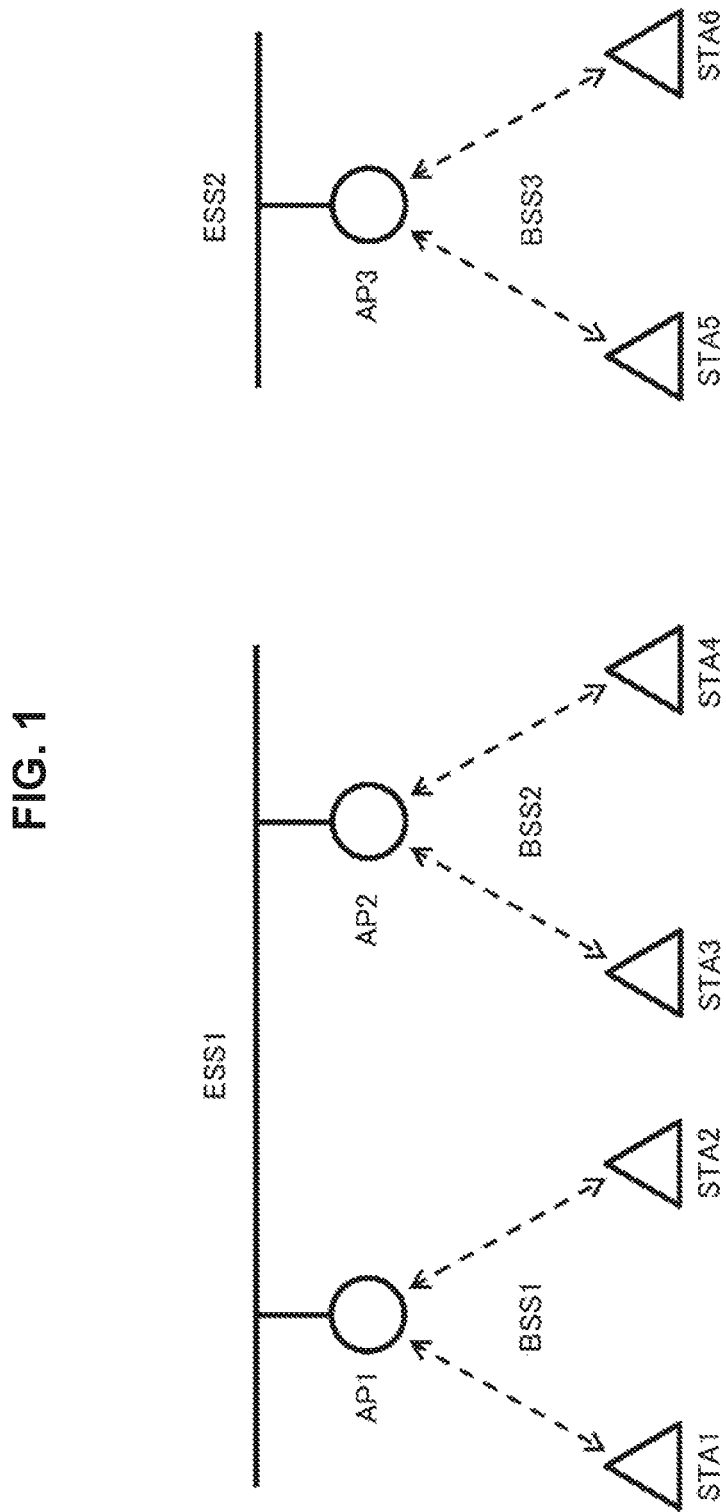
FIG. 1 is a diagram illustrating a configuration example of a wireless system.

An embodiment of the technology disclosed in the present specification will be described below with reference to the drawings.

It is assumed that a wireless terminal apparatus transmits a frame to which, for example, information regarding a BSS as a first network group to which the own wireless terminal apparatus belongs is added as an identifier. In wireless LAN standardization work for the latest IEEE 802.11ax, it is assumed that a frame to which a field called BSS-color is added as an identifier of a BSS is transmitted. Further, it is assumed that this type of the identifier of the BSS is stored in a physical header at the beginning of the frame so as to enable early determination of reception processing of frames from wireless terminals belonging to other groups (see, for example, Patent Literature 1). Further, it is assumed that a base station collects statistical information regarding frames arriving from other groups, notifies base stations of the statistical information, and operates in cooperation with other base stations via an upper second network group (for example, an ESS) on the basis of the information.

Here, BSS-color is information for individually identifying BSSs within an upper ESS including a BSS to which the own wireless terminal apparatus belongs. As an identifier of the BSS, there is also a BSSID stored within a MAC header. The BSSID is an identifier which is the same as a MAC address of the AP and which has a length of 48 bits (mentioned above). Meanwhile, the BSS-color information is short information having a form which is more simplified than a form of the BSSID and having, for example, a length of 6 bits. That is, BSS-color is information which is different from the BSSID in the related art in that BSS-color has a simplified form.

By BSS-color being stored in the physical header, a wireless terminal which receives a frame can determine signals from other BSSs which overlap with a signal of the own BSS (Overlapping BSS: OBSS) early. However, there is a limitation in an information amount in the physical header, and there is a possibility that the number of identifiers sufficient to avoid overlapping cannot be secured. For example, in the case where BSS-color having a length of 6 bits is used, only 64 network groups at a maximum can be identified.

Further, in the case where a base station performs cooperative operation with other base stations on the basis of statistical information regarding the frames arriving from other groups, there is a possibility that cooperative operation cannot be performed between base stations belonging to further upper different second network groups. For example, in the case where cooperative operation is desired to be performed among a plurality of BSSs included in the same ESS, it is preferable that the wireless terminal can identify whether the received frame is a signal in the same ESS or a signal from other ESSs as well as identify whether the received frame is a signal of the own BSS or a signal from the OBSS.

For example, a wireless terminal apparatus which transmits a frame including a physical header including an identifier of the base station is proposed (see, for example, Patent Literature 1). This wireless terminal apparatus finishes access procedure in the case where the identifier of the base station indicated within the received frame is different from a base station of the BSS to which the own wireless terminal apparatus belongs. However, because there is a limitation in the number of identifiers of the base stations which can be allocated, and there is a possibility that the same identifier may be allocated to two or more base stations, there is a possibility that access procedure is finished for a frame which should be originally received.

Further, a power control apparatus which adjusts transmission power of all network groups so that throughput becomes a maximum between a certain network group and another adjacent network group, is also proposed (see, for example, Patent Literature 2). Here, to maximize the throughput, it is assumed that statistical information of arrival frames at respective wireless terminals is used. However, if the statistical information of the arrival frames is collected only on the basis of the identifiers of the base stations such as BSS-color, for example, in the case where it is impossible to identify that the information is information of a frame from a wireless terminal belonging to other upper second network groups with which the base station cannot perform cooperative operation, even if the statistical information is reported to the base station, the base station cannot effectively utilize the statistical information.

Therefore, in the present specification, a method for transmitting a frame to which information regarding an upper second network group including a first network group to which an own wireless terminal belongs is added as an identifier, a method for extending the number of allocated identifiers of the first network groups using a location in a frame which is effective for addition of the identifier and the identifier of the second network group, and a method for effectively processing the statistical information when the identifier of the upper second network group is used, will be proposed below.

FIG. 1 illustrates a configuration example of a wireless system to which the technology disclosed in the present specification is applied. In FIG. 1, a base station (AP) and a plurality of terminal stations (STAs) connected to the base station constitute one first network group (BSS), and, further, a plurality of first network groups constitutes a wireless system. In the example in FIG. 1, an AP 1 and an STA 1 and an STA 2 connected to the AP 1 constitute a BSS 1, an AP 2 and an STA 3 and an STA 4 connected to the AP 2 constitute a BSS 2, and an AP 3 and an STA 5 and an STA 6 connected to the AP 3 constitute a BSS 3.

Further, part of a plurality of BSSs is connected to each other in a wired or wireless manner, and constitutes an upper second network group (ESS). In the example in FIG. 1, the two base stations AP 1 and AP 2 are connected via, for example, a cable of Ethernet (registered trademark), or the like, and constitute an upper second network group ESS 1. Meanwhile, the BSS 3 including the AP 3 and the STA 5 and the STA 6 connected to the AP 3 constitute an ESS 2.

Further, it is assumed that a plurality of ESSs which is independent of each other exists in the wireless system. In the example in FIG. 1, the ESS 2 exists independently of the above-described ESS 1.

Note that, it should be appreciated that the number of APs, STAs, BSSs and ESSs is not limited to the example illustrated in FIG. 1 to realize the technology disclosed in the present specification.

Figure 2:
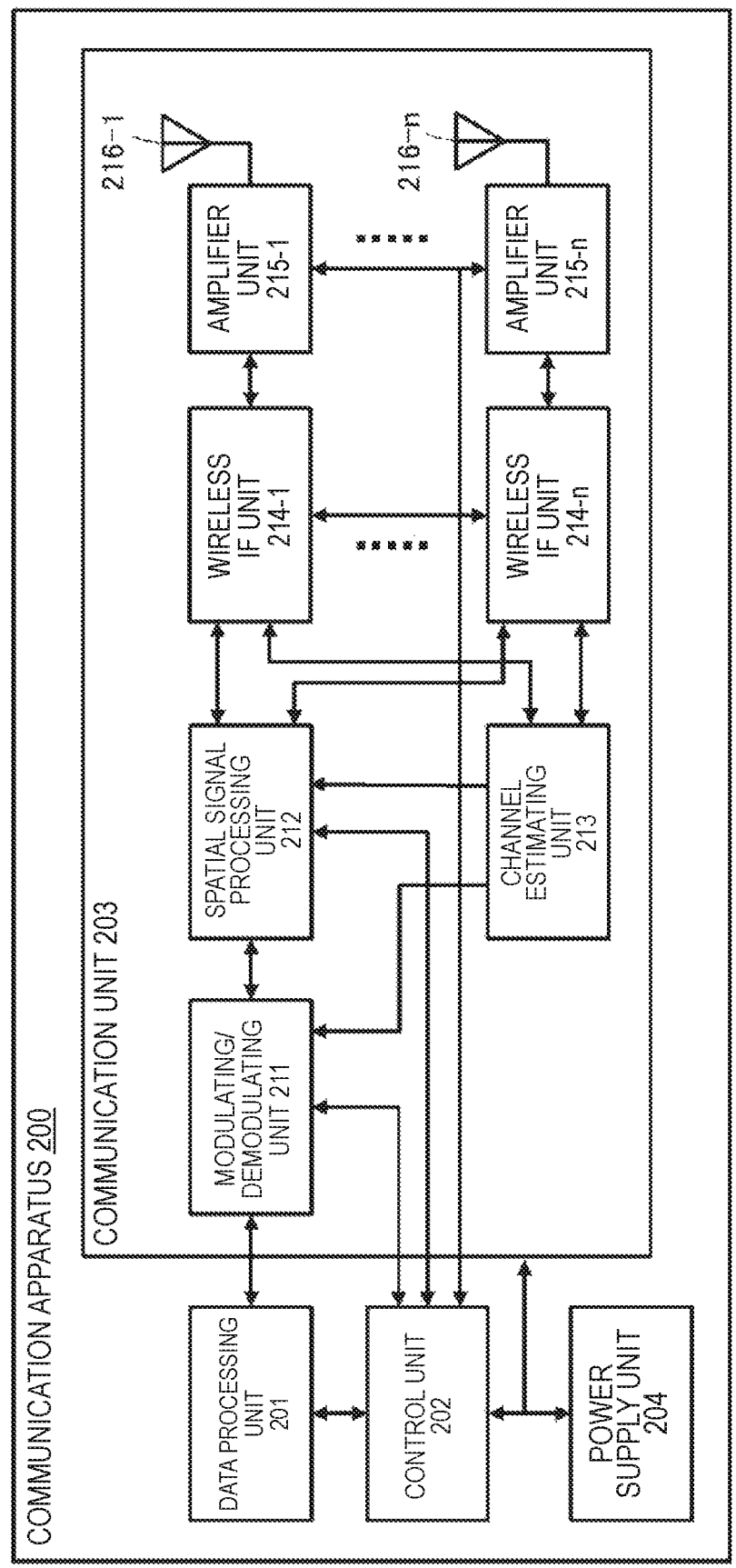
FIG. 2 is a diagram illustrating a configuration example of a communication apparatus 200.

FIG. 2 illustrates a functional configuration example of the communication apparatus 200 which performs communication operation as the AP or the STA in the wireless communication system as illustrated in FIG. 1 (in other words, including a plurality of BSSs, and a plurality of ESSs in which part of the BSSs is connected to each other). It should be understood that a basic configuration of the AP is similar to that of the STA.

The communication apparatus 200 includes a data processing unit 201, a control unit 202, a communication unit 203 and a power supply unit 204. Further, the communication unit 201 further includes a modulating/demodulating unit 211, a spatial signal processing unit 212, a channel estimating unit 213, a wireless interface (IF) unit 214, an amplifier unit 215 and an antenna 216. However, one set of the wireless interface unit 214, the amplifier unit 215 and the antenna 216 may constitute one transmission/reception branch, and two or more transmission/reception branches may constitute the communication unit 201. Further, there is also a case where functions of the amplifier unit 215 are incorporated into the wireless interface unit 214.

Upon transmission during which data is input from a protocol upper layer (not illustrated), the data processing unit 201 generates a packet for wireless transmission from the data, performs processing such as addition of a header for media access control (MAC) and addition of an error detecting code, and provides the processed data to the modulating/demodulating unit 211. Further, upon reception during which there is input from the modulating/demodulating unit 211, the data processing unit 201 performs analysis of MAC Header, detection of a packet error, re-order processing, or the like, and provides the processed data to a protocol upper layer of the data processing unit 201.

The control unit 202 transfers information among respective units within the communication apparatus 200. Further, the control unit 202 performs setting of parameters at the modulating/demodulating unit 211 and the spatial signal processing unit 212, and scheduling of packets at the data processing unit 201. Still further, the control unit 202 performs setting of parameters of the wireless interface unit 214 and the amplifier unit 215, and transmission power control.

Particularly, in the present embodiment, the control unit 202 controls each unit so as to transmit a frame to which information regarding the first network group (BSS) to which the own apparatus belongs and information regarding the upper second network group (ESS) to which the first network group belongs are added as respective identifiers. Further, the control unit 202 controls each unit so as to perform identification of the ESS, identification of the BSS, determination as to whether to finish access procedure, and statistical processing of the arrival frames on the basis of the information regarding the ESS and the BSS added to the frame.

Upon transmission, the modulating/demodulating unit 211 performs processing of encoding, interleaving and modulation on input data from the data processing unit 201 on the basis of a coding and modulation scheme set by the control unit 201, generates a data symbol stream and provides the data symbol stream to the spatial signal processing unit 212. Further, upon reception, the modulating/demodulating unit 211 performs processing of demodulation, de-interleaving and decoding which is inverse to the processing upon transmission, on input from the spatial signal processing unit 212 on the basis of the coding and modulation scheme set by the control unit 201, and provides the data to the data processing unit 201 or the control unit 202.

Upon transmission, the spatial signal processing unit 212 performs signal processing for space separation on the input from the modulating/demodulating unit 211 as necessary and provides the obtained one or more transmission symbol streams to respective wireless interface units 214. Meanwhile, upon reception, the spatial signal processing unit 212 performs signal processing on the received symbol streams input from the respective wireless interface units 214, performs space separation of the streams as necessary and provides the results to the modulating/demodulating unit 211.

The channel estimating unit 213 calculates complex channel gain information of a propagation path from a preamble portion and a training signal portion among input signals from the respective wireless interface units 214. Then, the calculated complex channel gain information is utilized for demodulation processing at the modulating/demodulating unit 211 and spatial processing at the spatial signal processing unit 212 via the control unit 202.

Upon transmission, the wireless interface unit 214 converts input from the spatial signal processing unit 212 into an analog signal, performs filtering and up-conversion to a carrier frequency and sends out the signal to the antenna 216 or the amplifier unit 215. Meanwhile, upon reception, the wireless interface unit 214 performs processing of down-conversion and conversion to a digital signal, which is processing inverse to processing upon transmission, on input (received signal of the carrier frequency) from the antenna 216 or the amplifier unit 215, and provides the data to the spatial signal processing unit 212 and the channel estimating unit 213.

Upon transmission, the amplifier unit 215 amplifies the analog signal input from the wireless interface unit 214 to predetermined power and sends out the signal to the antenna 216. Further, upon reception, the amplifier unit 215 amplifies low noise of the received signal input from the antenna 216 to predetermined power and outputs the signal to the wireless interface unit 214. There is a case where at least one of functions upon transmission or functions upon reception of the amplifier unit 215 is incorporated into the wireless interface unit 214.

The power supply unit 204 is constituted with a battery power supply or a fixed power supply such as a commercial power supply, and supplies power for drive to each unit within the communication apparatus 200.

Note that, while the communication apparatus 200 can further include functional modules other than the illustrated modules, because the functional modules other than the illustrated modules are not directly related to the technology disclosed in the present specification, illustration and description will be omitted here.

Examples (1) to (3) of the communication system to which the technology disclosed in the present specification is applied will be described below.

(1) A frame to which information regarding an upper network group (ESS) including a network group (BSS) to which an own wireless terminal belongs is added as an identifier is transmitted.

(2) The number of allocated identifiers of the network groups (BSSs) to which the own wireless terminal belongs is extended using identifiers of the upper network groups (ESSs).

(3) Statistical information is collected using the identifiers of the upper networks (ESSs).

Example 1

In Example 1, a communication apparatus operating as the STA transmits a frame to which information regarding the upper second network group (ESS) including the first network group (BSS) to which the own communication apparatus belongs is added (in header information within the frame) as an identifier. In the following description, an identifier regarding the BSS will be also referred to as a "BSS identifier", and an identifier regarding the ESS will be also referred to as an "ESS identifier".

Figure 3:
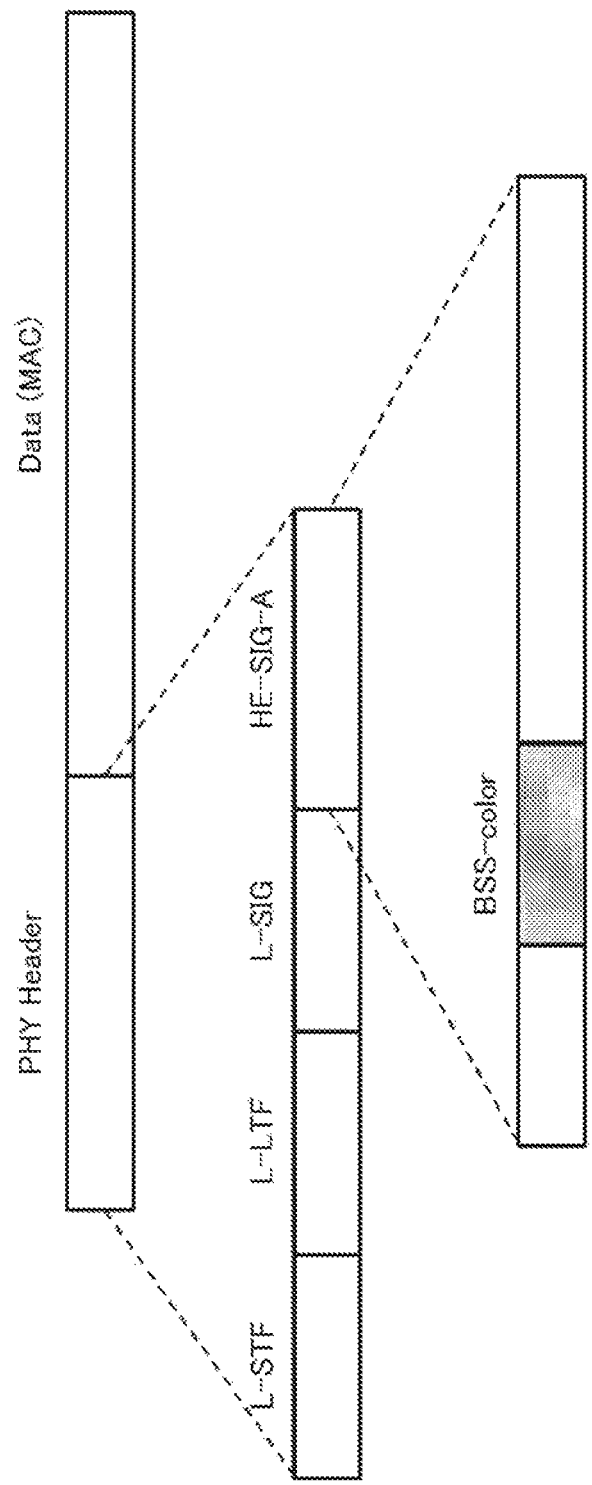
FIG. 3 is a diagram illustrating a frame configuration example not including an ESS identifier.

FIG. 3 illustrates a frame configuration example in the related art which does not include the ESS identifier. The illustrated frame has a frame configuration corresponding to a frame configuration in a wireless LAN system for which standardization work of IEEE 802.11ax is currently underway, and includes Phy Header and a Data (MAC) portion.

Phy Header includes a legacy-short training field (L-STF), a legacy-long training field (L-LTF), a legacy-signal field (L-SIG) and a high efficiency-signal-A field (HE-SIG-A). Further, MAC addresses of a transmission source and a transmission destination and a data body are stored in the Data portion.

Here, while BSS-color is stored in HE-SIG-A as the BSS identifier, the ESS identifier is not stored. BSS-color is short information having a length of approximately 6 bits for individually identifying the BSSs within the upper ESS including the BSS to which the own wireless terminal belongs, and is set at a value which does not overlap with other BSSs within the ESS (mentioned above). The wireless terminal which receives the frame illustrated in FIG. 3 can judge whether this received frame is transmitted from the BSS to which the own wireless terminal belongs early by reading the information stored in the physical header.

Figure 4:
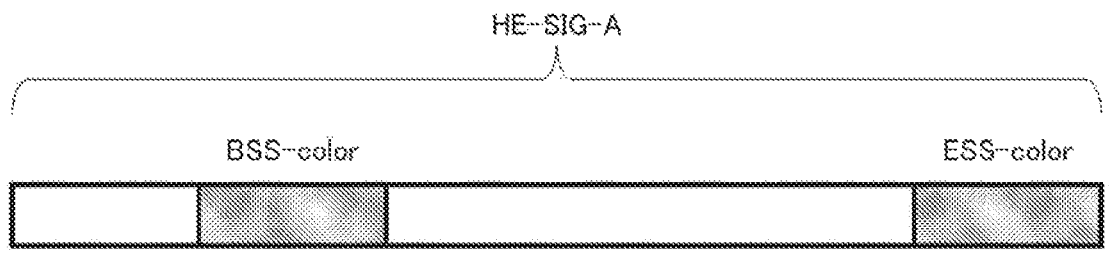
FIG. 4 is a diagram illustrating a configuration example of a high-efficiency signal to which the ESS identifier is added.

FIG. 4 illustrates a configuration example of HE-SIG-A to which ESS-color is added as the ESS identifier. In this frame configuration, a region for storing ESS-color is newly extended in HE-SIG-A illustrated in FIG. 3.

Here, in the present embodiment, ESS-color is an identifier used for identifying the own ESS, and ESS-color is, for example, short information having a length of approximately 9 bits, and is different from an ESSID in the related art which is constituted with up to 32 alphanumeric characters in that ESS-color has a simplified form.

By using the storage method illustrated in FIG. 4, the wireless terminal which receives the frame can judge whether this received frame is transmitted from the upper ESS including the BSS to which the own wireless terminal belongs early by reading the information stored in the physical header.

Note that, while, in the example illustrated in FIG. 4, a new region for storing ESS-color is provided at the end of HE-SIG-A, the location is not limited to the end, and the new region may be provided at the beginning or in the middle of HE-SIG-A. Further, the new region for storing ESS-color may be divided into two or more portions.

Figure 5:
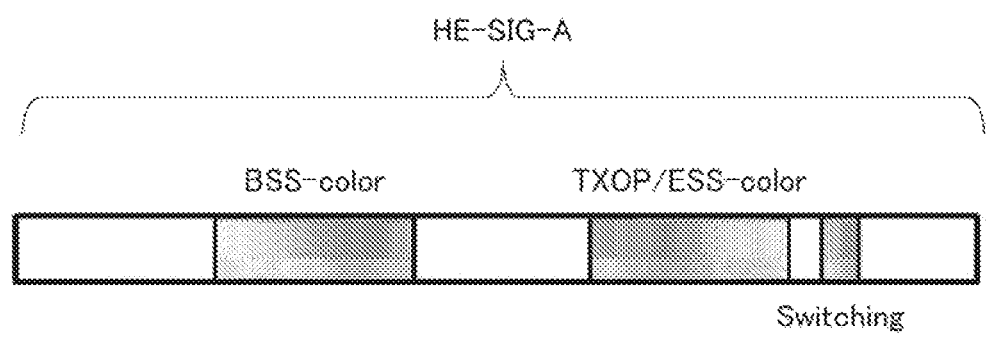
FIG. 5 is a diagram illustrating another configuration example of the high-efficiency signal to which the ESS identifier is added.

Further, FIG. 5 illustrates another configuration example of HE-SIG-A to which ESS-color is added as the ESS identifier. In this frame configuration, a field for storing existing other information is switched and used as a field for storing ESS-color in HE-SIG-A illustrated in FIG. 3. Further, a switching notification (Switching) bit for indicating which of the existing other information and ESS-color is indicated in this field is further stored.

In the example illustrated in FIG. 5, as the existing other information which is to be switched to ESS-color, a TXOP field in which information regarding a channel use period is described is utilized. Further, the switching notification bit may be a bit newly added within HE-SIG-A, and an existing Reserve bit may be used. Note that, while, in the example illustrated in FIG. 5, the switching (Switching) bit exists at a rear portion of the region where ESS-color is stored, a location where the bit is disposed is not limited to this.

By using the storage method of the ESS identifier illustrated in FIG. 5, the wireless terminal which receives such a frame can judge whether the received frame is transmitted from the upper ESS including the BSS to which the own wireless terminal belongs early by reading the information stored in Phy Header.

Further, because the frame configuration illustrated in FIG. 5 does not require extension or change of Phy Header such as addition of a new region, it is possible to maintain backward compatibility with a wireless terminal having similar communication standards (for example, communication standards in which the frame configuration illustrated in FIG. 3 is employed).

Further, according to the frame configuration illustrated in FIG. 5, the wireless terminal can transmit ESS-color using an existing field such as TXOP only when it is necessary, and can store a specified parameter such as TXOP and perform transmission as usual in the remaining most period. A case where it is necessary to transmit ESS-color includes, for example, a case where the STA becomes associated with the BSS, a case where BSS-color overlaps with each other, or the like.

Figure 6:
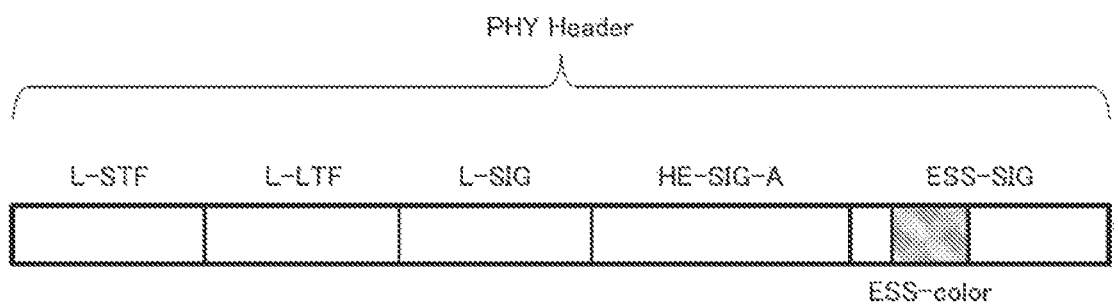
FIG. 6 is a diagram illustrating a configuration example of Phy Header to which the ESS identifier is added.

FIG. 6 illustrates a frame configuration example in which ESS-SIG including ESS-color as the ESS identifier is newly added to Phy Header. In this frame configuration, a new ESS-SIG field region for storing ESS-color is extended in Phy Header in the related art (illustrated in, for example, FIG. 3).

By using the storage method of the ESS identifier illustrated in FIG. 6, the wireless terminal which receives a frame including ESS-color can judge whether the received frame is transmitted from the upper ESS including the BSS to which the own wireless terminal belongs early by reading the information stored in Phy Header.

Note that, while, in the example illustrated in FIG. 6, a new ESS-SIG region for storing ESS-color is disposed immediately after HE-SIG-A, the location is not limited to this location, and the new ESS-SIG region may be disposed immediately before HE-SIG-A or may be disposed at a location adjacent to other existing regions within Phy Header.

Figure 7:
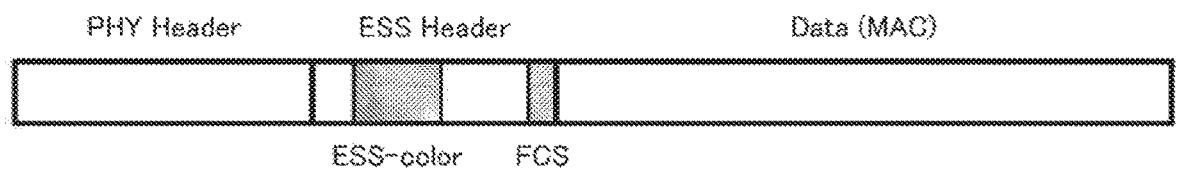
FIG. 7 is a diagram illustrating a frame configuration example to which ESS Header including the ESS identifier is newly added.

FIG. 7 illustrates a frame configuration example in which ESS Header including ESS-color as the ESS identifier is newly added. While the frame in the related art is constituted with Phy Header and a Data (MAC) portion (see, for example, FIG. 3), in the frame configuration example illustrated in FIG. 7, ESS Header is inserted at a portion after Phy Header and before the Data portion. It can be regarded that a new ESS Header region for storing ESS-color is extended in the frame configuration in related art.

Further, a frame check sequence (FCS) which is independent of the subsequent Data portion is stored in the illustrated ESS Header, so that it is possible to confirm content of ESS Header including ESS-color without receiving all the Data portion. That is, ESS Header is a region which can be decoded independently of the Date portion.

By using the storage method of the ESS identifier illustrated in FIG. 7, the wireless terminal which receives a frame can judge whether the received frame is transmitted from the upper ESS including the BSS to which the own wireless terminal belongs early without receiving all the Data portion after receiving Phy Header and ESS Header.

Further, in the case where ESS Header is newly added as illustrated in FIG. 7, because there is no limitation in an information amount as in the case where ESS-color is stored within Phy Header, it is possible to store a larger amount of information regarding the upper ESS including the BSS to which the wireless terminal which is a frame transmission source belongs. Therefore, the reception side can receive a larger amount of information regarding the ESS as well as ESS-color.

Figure 8:
FIG. 8 is a diagram illustrating a frame configuration example in which the ESS identifier is added in a Data portion.

FIG. 8 illustrates a frame configuration example in which ESS-color is added to the Data (MAC) portion as the ESS identifier. ESS-color may be added to a location either in MAC Header or in a data body as long as the location is within the Data portion. Further, in the case where ESS-color is added to the data body, part of an aggregated MAC protocol data unit (A-MPDU) which is constituted by a plurality of MAC protocol data units (MPDUs) being coupled may be used for storing ESS-color.

As illustrated in FIG. 8, by using a method in which the ESS identifier is stored within the Data portion, because there is no limitation in an information amount as in the case where Phy Header is used, it is possible to store a larger amount of information regarding the upper ESS including the BSS to which the wireless terminal which is a frame transmission source belongs. Therefore, the reception side can receive a larger amount of information regarding the ESS as well as ESS-color.

However, in the case where the storage method of the ESS identifier illustrated in FIG. 8 is used, the wireless terminal which receives a frame cannot judge whether the received frame is transmitted from the upper ESS including the BSS to which the own wireless terminal belongs unless the wireless terminal decodes all the Data portion. Therefore, in the case where statistical information of the received frames from the same ESS is processed, or the like, even if the wireless terminal knows that the received frame is not a signal of the own BSS at a time point when the wireless terminal receives Phy Header, the wireless terminal has to wastefully perform reception processing of all signals from other ESSs.

Figure 9:
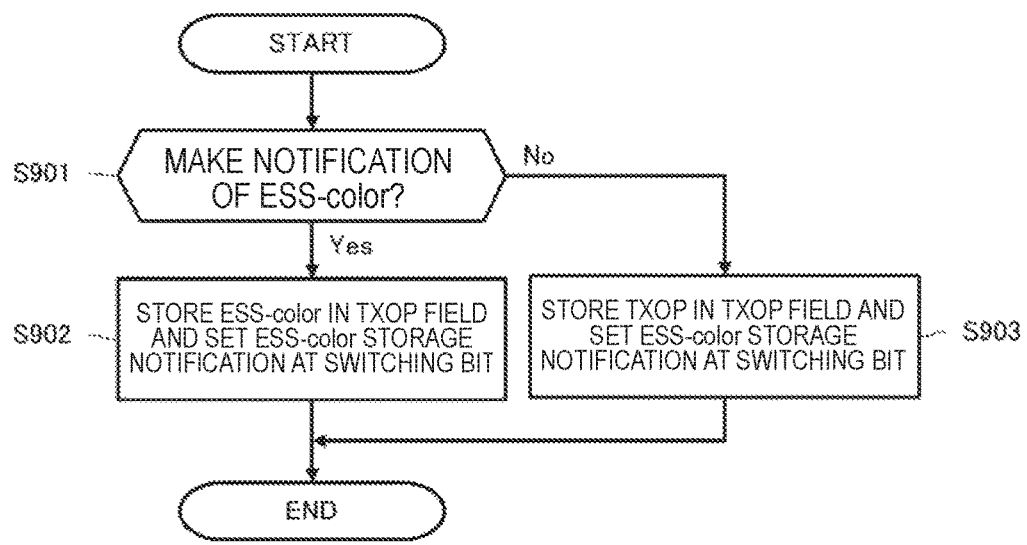
FIG. 9 is a flowchart illustrating processing procedure for switching and using a field for storing existing other information within Phy Header as a field for storing the ESS identifier.

FIG. 9 illustrates processing procedure in a form of a flowchart, to be executed by the wireless terminal for switching and using a field for storing existing other information (TXOP) within Phy Header as a field for storing ESS-color, as illustrated in FIG. 5. It is assumed that the illustrated processing procedure is executed mainly at the data processing unit 201 within the communication apparatus 200 illustrated in, for example, FIG. 2.

First, the wireless terminal judges whether or not to make a notification of the ESS identifier (step S901). For example, in the case where the STA becomes associated with the BSS, or in the case where BSS-color overlaps with each other, the wireless terminal judges that it is necessary to transmit ESS-color.

Then, in the case where it is judged to make a notification of the ESS identifier (step S901: Yes), the wireless terminal stores ESS-color as the ESS identifier in a field for storing existing other information within HE-SIG-A such as TXOP, sets a value indicating that the field is switched to the field for storing the ESS identifier at a switching (Switching) bit (step S902), and finishes the present processing routine. At the reception side, in the case where the reception side is notified of ESS-color, if ESS-color does not match even if BSS-color overlaps with each other, the reception side can perform reception processing of the signal as a signal from the OBSS.

Meanwhile, in the case where it is judged not to make a notification of the ESS identifier (step S901: No), the wireless terminal stores existing other information as is in the field for storing existing other information such as TXOP and sets a value indicating that the existing other information is stored as is in the field at the switching bit (step S903), and finishes the present processing routine.

According to the processing procedure illustrated in FIG. 9, the wireless terminal can transmit ESS-color using the existing field such as TXOP only when it is necessary, and can store a specified parameter such as TXOP and perform transmission as usual in the remaining most period.

According to Example 1, because both BSS-color and ESS-color are stored in the frame, the reception side can easily identify whether the frame is a signal from other BSSs within the same ESS or a signal from other BSSs which do not belong to the same ESS as well as identify whether the frame is a signal of the own BSS or a signal from other BSSs. As a result, by the signal from other BSSs within the same ESS being also handled in a similar manner to the signal of the own BSS, it is possible to easily realize network operation in which the BSSs operate in cooperation with each other within the ESS.

Example 2

In Example 2, the identifier of the first network group (BSS) to which the communication apparatus belongs is extended using the identifier of the upper second network group (ESS). For example, part of the region for storing ESS-color which is the ESS identifier is handled as the region for storing part of BSS-color which is the BSS identifier. Note that, while, in the following description, a specific frame configuration example in the present example based on the frame configuration example illustrated in FIG. 4 as Example 1 will be described, the present example can be also applied to other frame configuration examples respectively illustrated in FIG. 5 to FIG. 8 as Example 1 in a similar manner.

Figure 10:
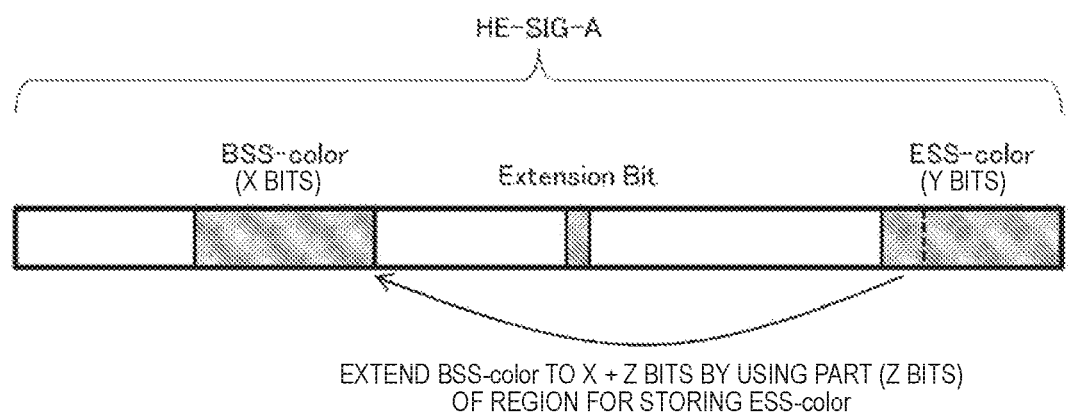
FIG. 10 is a diagram illustrating a frame configuration example in which BSS-color is extended by part of a region for storing ESS-color being used as a region for storing part of BSS-color.
Figure 11:
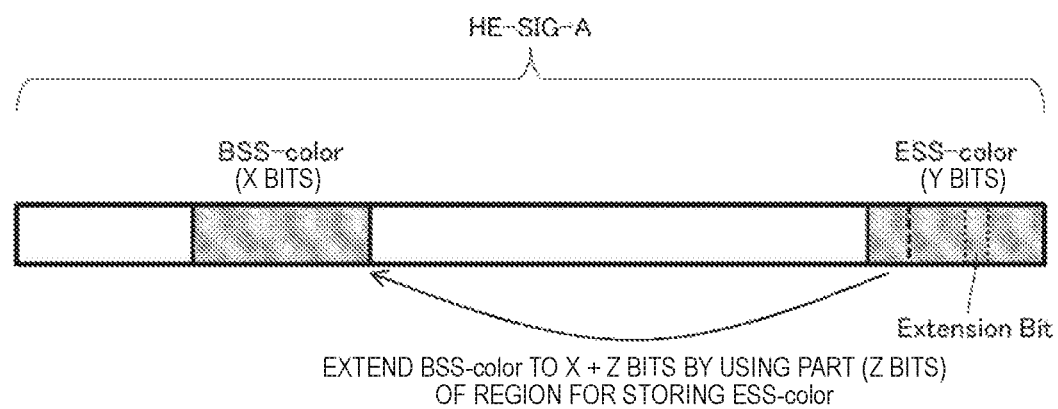
FIG. 11 is a diagram illustrating another frame configuration example in which BSS-color is extended by part of the region for storing ESS-color being used as the region for storing part of BSS-color.

FIG. 10 and FIG. 11 respectively illustrate frame configuration examples for extending a region for storing BSS-color by using part of the region for storing ESS-color which is the ESS identifier as a region for storing part of BSS-color which is the BSS identifier. In both FIG. 10 and FIG. 11, in a frame configuration in which the region for storing ESS-color is newly added in HE-SIG-A in which BSS-color is stored as the BSS identifier, part of the region for storing ESS-color can be used as the region for storing part of BSS-color.

For example, assuming that the region for storing BSS-color has X bits, and the region for storing ESS-color has Y bits (where X and Y are positive integers), Z bits in the region for storing ESS-color can be used as the region for storing BSS-color (where Z is a positive integer, and Y≥Z). As a result, the region for storing BSS-color is extended to X+Z bits, and the region for storing ESS-color is reduced to Y−Z bits. That is, it is possible to extend BSS-color from a length of X bits to a length of X+Z bits, so that it is possible to secure the number of identifiers sufficient to avoid overlapping within the same ESS.

Specifically, it is assumed that, in the original frame configuration, 6 bits are allocated as the region for storing BSS-color, and 9 bits are allocated as the region for storing ESS-color. Here, in the case where 3 bits in the region for storing ESS-color are utilized as the region for storing part of BSS-color, it is possible to extend BSS-color to a length of 9 bits, so that it is possible to secure the number of identifiers sufficient to avoid overlapping within the same ESS.

Further, the frame configuration examples illustrated in FIG. 10 and FIG. 11 both include an extension bit (Extension bit) for making a notification as to whether or not part of the region for storing ESS-color is used as a region for storing part of BSS-color. In the example illustrated in FIG. 10, the extension bit is disposed at a location different from the region in which ESS-color is stored. While the extension bit is disposed between the region in which BSS-color is stored and the region in which ESS-color is stored, order of these storage regions and bit arrangement is not limited to this. Further, in the example illustrated in FIG. 11, the extension bit is disposed at any location within the region in which ESS-color is stored. However, this extension bit may be stored in, for example, a Reserve region which is different from the region in which BSS-color is stored or the region in which ESS-color is stored within HE-SIG-A, or a new region for storing the bit may be added.

For example, 1 is set as this extension bit in the case where part of the region for storing ESS-color is used as the region for storing part of BSS-color, and 0 is set in other cases. As described above, in the case where 1 is set as the extension bit assuming that the region for storing BSS-color has X bits, and the region for storing ESS-color has Y bits, Z bits out of the region for storing ESS-color are used as the region for storing BSS-color. As a result, the actual region for storing BSS-color has X+Z bits, and the actual region for storing ESS-color has Y−Z bits.

Here, the number of bits Z of the region for storing ESS-color to be used as the region for storing BSS-color may be a specific value determined in advance or may be one of a plurality of specific values determined in advance. What kind of value is used may be indicated in a field which is further newly added or may be indicated with an extension bit constituted with a plurality of bits.

As illustrated in FIG. 10 and FIG. 11, in the case where part of the region for storing ESS-color is used as the region for storing part of BSS-color, base stations which constitute a certain BSS preferably perform the same extension setting so that the same ESS is set for the base stations belonging to the same ESS. This setting may be made by information being voluntarily exchanged between the base stations. For example, in the case where a certain base station detects a number of BSSs around the base station and detects that BSS-color is highly likely to overlap with each other, the base station may request a base station connected to the same ESS to extend part of ESS-color as part of BSS-color.

Figure 12:
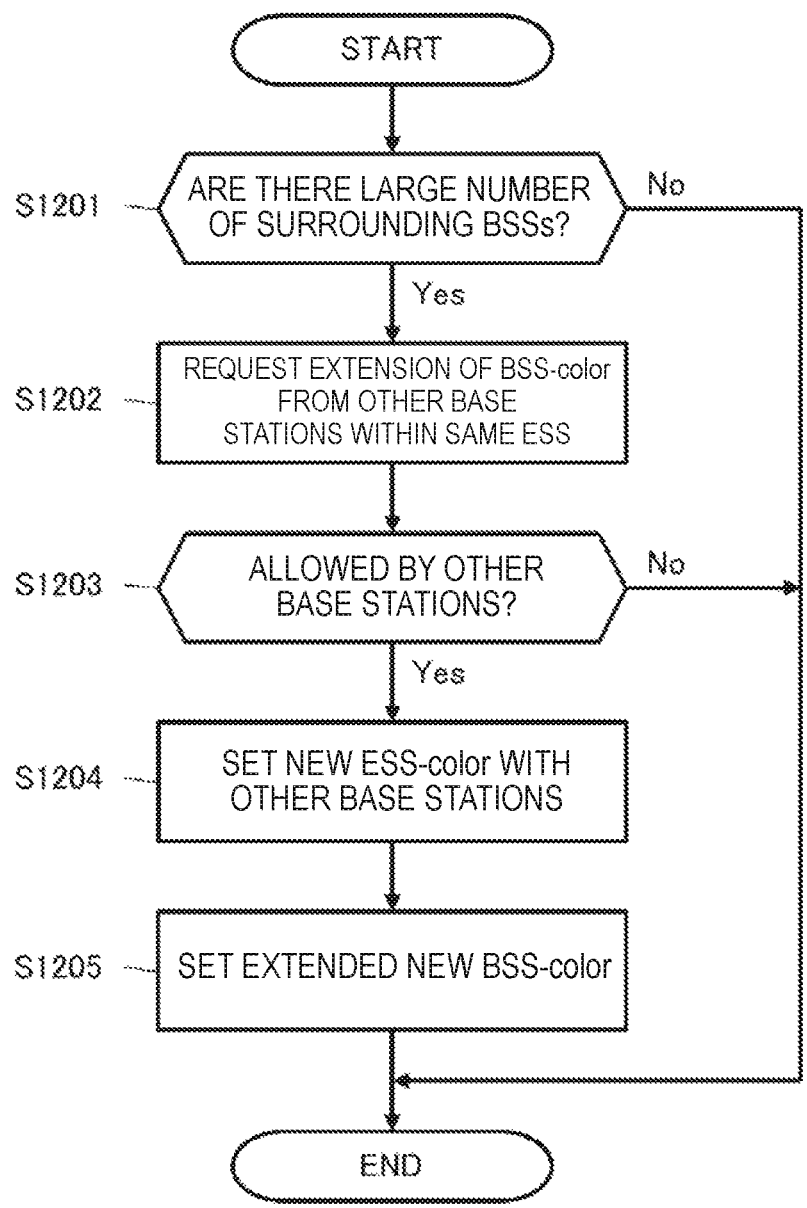
FIG. 12 is a flowchart illustrating processing procedure for performing setting for handling part of the ESS identifier as part of a BSS identifier.

FIG. 12 illustrates processing procedure in a form of a flowchart, for the communication apparatus operating as a base station to make setting to handle part of the region for storing ESS-color which is the ESS identifier as the region for storing part of BSS-color which is the BSS identifier.

In the case where the base station detects a number of BSSs around the base station and judges that BSS-color is highly likely to overlap with each other (step S1201: Yes), the base station requests other base stations connected to the same ESS to extend the region for storing BSS-color by storing part of BSS-color in part of the region for storing ESS-color (step S1202).

Here, in the case where the base station can receive a response from the other base stations indicating that the other base stations allow to extend the region for storing BSS-color by storing part of BSS-color in part of the region for storing ESS-color (step S1203: Yes), the base station sets the reduced new ESS-color with the other base stations (step S1204). Then, the base station extends the region for storing BSS-color by setting part of the region for storing ESS-color as the region for storing part of BSS-color, sets new BSS-color (step S1205) and finishes the present processing routine.

On the other hand, in the case where the other base stations do not allow to extend the region for storing BSS-color by storing part of BSS-color in part of the region for storing ESS-color (step S1203: No), the base station skips the subsequent processing steps and finishes the present processing routine.

Note that setting for extending the region for storing BSS-color may be performed in advance by application for controlling the ESS or an operator. In this case, the base station may notify a subordinate terminal station as to whether or not part of ESS-color is extended and handled as part of BSS-color upon, for example, Association with the terminal station. Further, the base station may regularly notify the subordinate terminal station, for example, with a beacon in which this setting status is described.

Example 3

In Example 3, it is assumed that a notification of BSS-color and ESS-color is made for each frame by Example 1 or Example 2 being applied. Then, in Example 3, statistical information regarding frames arriving from other groups is collected using identifiers of upper network groups (ESSs).

Figure 13:
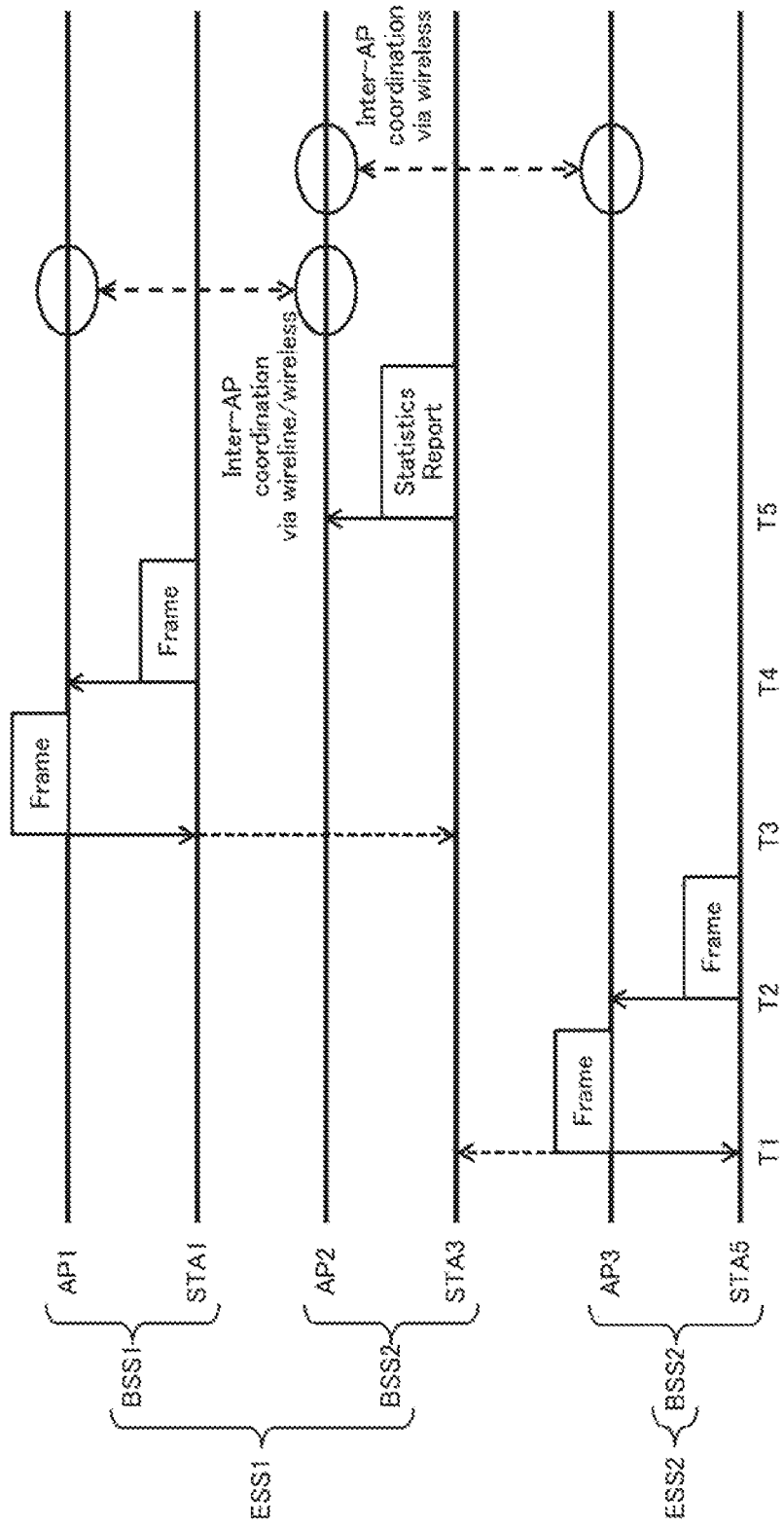
FIG. 13 is a diagram illustrating a communication sequence example for collecting statistical information regarding frames arriving from inside and outside the ESS using the ESS identifier.

FIG. 13 illustrates a communication sequence example in which statistical information regarding frames arriving from other groups is collected using the identifiers of the upper network groups (ESSs). However, the wireless system illustrated in FIG. 1 is assumed in FIG. 13, and the AP 1 and the STA 1 connected to the AP 1 constitute the BSS 1, the AP 2 and the STA 3 connected to the AP 2 constitute the BSS 2, the upper network group ESS 1 including the BSS 1 and the BSS 2 is constituted, the AP 3 and the STA 5 connected to the AP 3 constitute the BSS 3, and the upper network group ESS 2 including the BSS 3 is constituted.

Further, in FIG. 13, a horizontal axis indicates a time axis, a rectangle on each axis indicates a frame transmitted from a corresponding communication apparatus at time corresponding to a location on the horizontal axis, and a destination of a solid arrow extending in a longitudinal direction from the frame indicates a transmission destination of the frame. Still further, a destination of a dotted arrow extending in a longitudinal direction from the frame indicates arrival of the frame, instead of indicating the transmission destination of the arrow. Further, in each frame, ESS-color as the ESS identifier and BSS-color as the BSS identifier are stored on the basis of the above-described method in Example 1 and Example 2 or other methods.

Within the BSS 3 included in the ESS 2, a frame is transmitted from the AP 3 to the STA 5 at time T1, and a frame is transmitted from the STA 5 to the AP 3 at time T2. The frame transmitted by the AP 3 at time T1 also arrives at the STA 3 belonging to the BSS 2 included in the ESS 1 different from the ESS 2.

In this event, the STA 3 stores statistical information regarding the frame arriving from the AP 3 at time T1 along with ESS-color and BSS-color read from the frame. Examples of the statistical information described here can include a frame type, a received signal strength indicator (RSSI: an indicator indicating strength of a received signal), a signal-to-interference noise ratio (SINR), Duration (a scheduled time period during which a medium is used), a modulation and coding scheme (MCS: scheme information of a modulation scheme and a coding rate of Data), or the like. The Duration and the MCS can be respectively read from MAC Header and Phy Header.

Further, within the BSS 1 included in the ESS 1, a frame is transmitted from the AP 1 to the STA 1 at time T3, and a frame is transmitted from the STA 1 to the AP 1 at time T4. Among these, the frame transmitted by the AP 1 at time T3 also arrives at the STA 3 belonging to another BSS 2 included in the same ESS 1.

In this event, the STA 3 stores statistical information regarding the frame arriving from the AP 1 at time T3 along with ESS-color and BSS-color read from the frame.

Thereafter, the AP 2 requests report of statistical information (Statistics Report) to the subordinate STA 3 (that is, belonging to the own BSS 2). The STA 3 transmits statistical information stored until this time point to the AP 2 at time T5 in response to the request from the AP 2. Alternatively, the STA 3 may voluntarily transmit the statistical information to the AP 2 at time T5 without waiting for the request from the AP 2. In this event, the STA 3 transmits each piece of statistical information as data associated with ESS-color and BSS-color. Further, the STA 3 may transmit only statistical information regarding the frame received from the ESS 1 to which the STA 3 belongs and may avoid transmission of statistical information regarding a frame received from other ESS 2.

If the AP 2 receives the statistical information from the STA 3, the AP 2 may perform cooperative operation with other APs for the purpose of improving system characteristics on the basis of the information. In this event, the AP 2 may perform cooperative operation (Inter-AP coordination via wireline/wireless) with the AP 1 on the same ESS 1 on the basis of the statistical information from the ESS 1 to which the AP 2 belongs via wired communication or wireless communication constituting the ESS or via a frame such as Public Action Frame which can be communicated between the APs in a wireless manner and a communication scheme specified in IEEE 802.11.

Further, the AP 2 may perform cooperative operation (Inter-AP coordination via wireless) with the AP 3 on other ESS 2 on the basis of the statistical information from the ESS 2 to which the AP 2 does not belong via a frame which can be communicated between the APs in a wireless manner and a communication scheme. Alternatively, the AP 2 may perform cooperative operation only with the AP 1 on the ESS 1 to which the AP 2 belongs.

Note that, while operation in the case where the STA 3 receives frames from the BSS 1 and the BSS 3 to which the STA 3 does not belong has been described above, instead of the STA 3, the AP 2 itself may store statistical information of the arrival frames in association with ESS-color in a similar manner and collect the statistical information along with the statistical information received from the subordinate STA 3.

According to Example 3, it is possible to reduce statistical information regarding a wireless terminal belonging to a different ESS with which it is normally difficult to perform cooperative operation and make exchange of the statistical information efficient. Further, according to Example 3, the base station can support determination of implementation of cooperative operation with a base station belonging to a different ESS.

Figure 14:
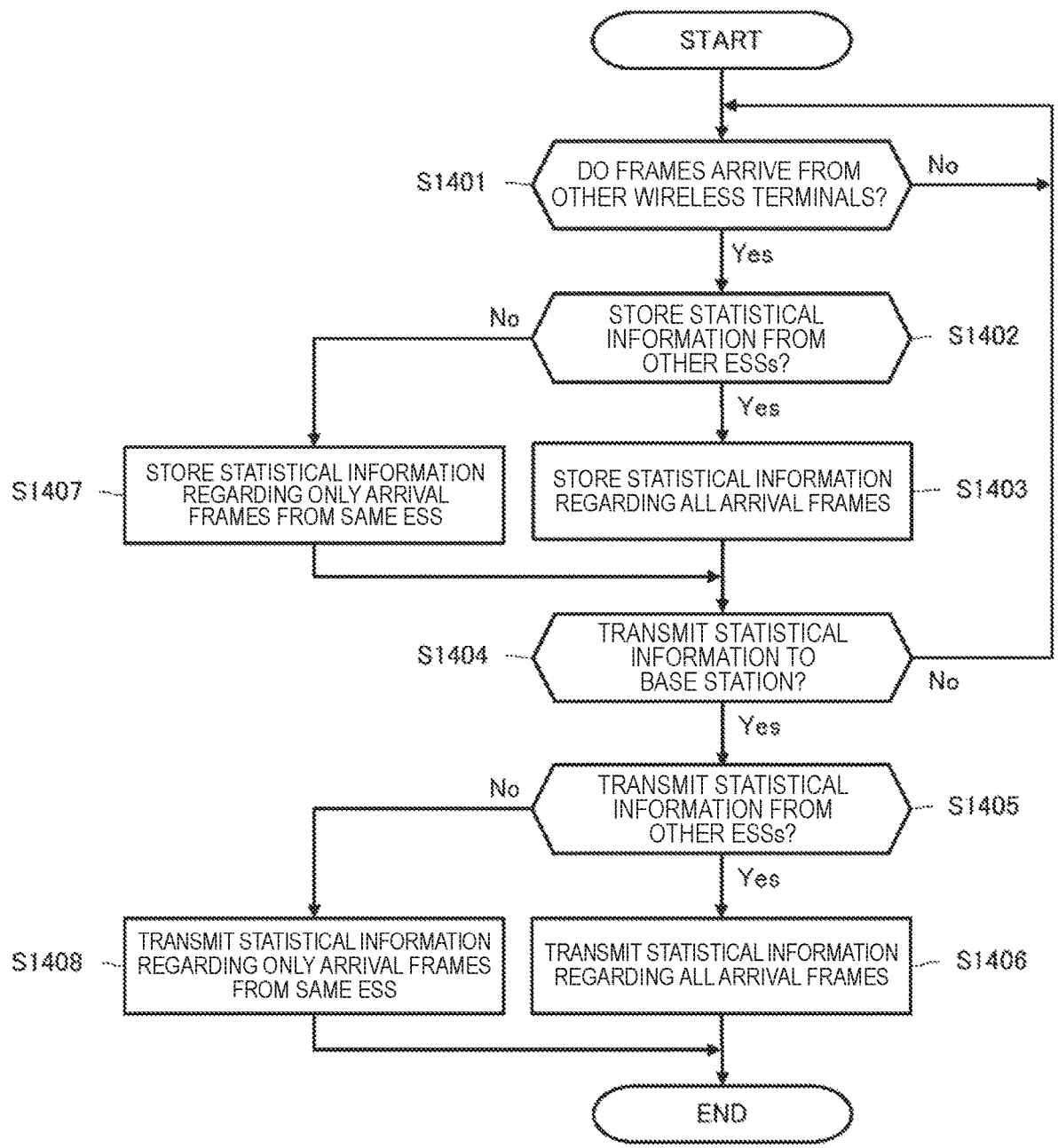
FIG. 14 is a flowchart illustrating processing procedure for a communication apparatus operating as an STA to store and report the statistical information regarding the arrival frames.

FIG. 14 illustrates processing procedure in a form of a flowchart, for the communication apparatus operating as the STA to store statistical information regarding arrival frames and report the statistical information to an AP of the BSS to which the own communication apparatus belongs. It is assumed that the illustrated processing procedure is executed mainly at the data processing unit 201 within the communication apparatus 200 illustrated in, for example, FIG. 2.

In the case where frames transmitted from other wireless terminals arrive (step S1401: Yes), the STA checks whether setting is made such that statistical information from ESSs other than the ESS including the BSS to which the own wireless terminal belongs is also stored (step S1402).

In the case where setting is made such that statistical information from ESSs other than the ESS including the BSS to which the own STA belongs is also stored (step S1402: Yes), the STA stores the statistical information regarding all the arrival frames in association with ESS-color and BSS-color (step S1403). Meanwhile, in the case where setting is made such that only statistical information regarding arrival frames from the ESS including the BSS to which the own STA belongs is stored (step S1402: No), the STA stores statistical information regarding only the arrival frames from the ESS in association with BSS-color (step S1407).

Then, the STA repeatedly executes processing of storing statistical information regarding the arrival frames until a timing for transmitting the statistical information to the AP of the BSS to which the own STA belongs comes (step S1404: No). The timing for transmitting the statistical information to the AP described here is, for example, a timing at which the STA receives a request for reporting the statistical information (Statistics Report) from the AP, a timing at which the STA itself voluntarily transmits the statistical information to the AP, or the like.

If the timing for transmitting the statistical information to the AP comes (step S1404: Yes), the STA checks whether setting is made such that statistical information from ESSs other than the ESS including the BSS to which the own STA belongs is also transmitted (step S1405).

In the case where setting is made such that statistical information from ESSs other than the ESS including the BSS to which the own STA belongs is also transmitted (step S1405: Yes), the STA transmits the statistical information regarding all the arrival frames to the AP (step S1406) and finishes the present processing routine.

Further, in the case where setting is made such that only statistical information from the ESS including the BSS to which the own STA belongs is transmitted (step S1405: No), the STA transmits statistical information regarding only the arrival frames from the ESS (step S1408) and finishes the present processing routine.

Figure 15:
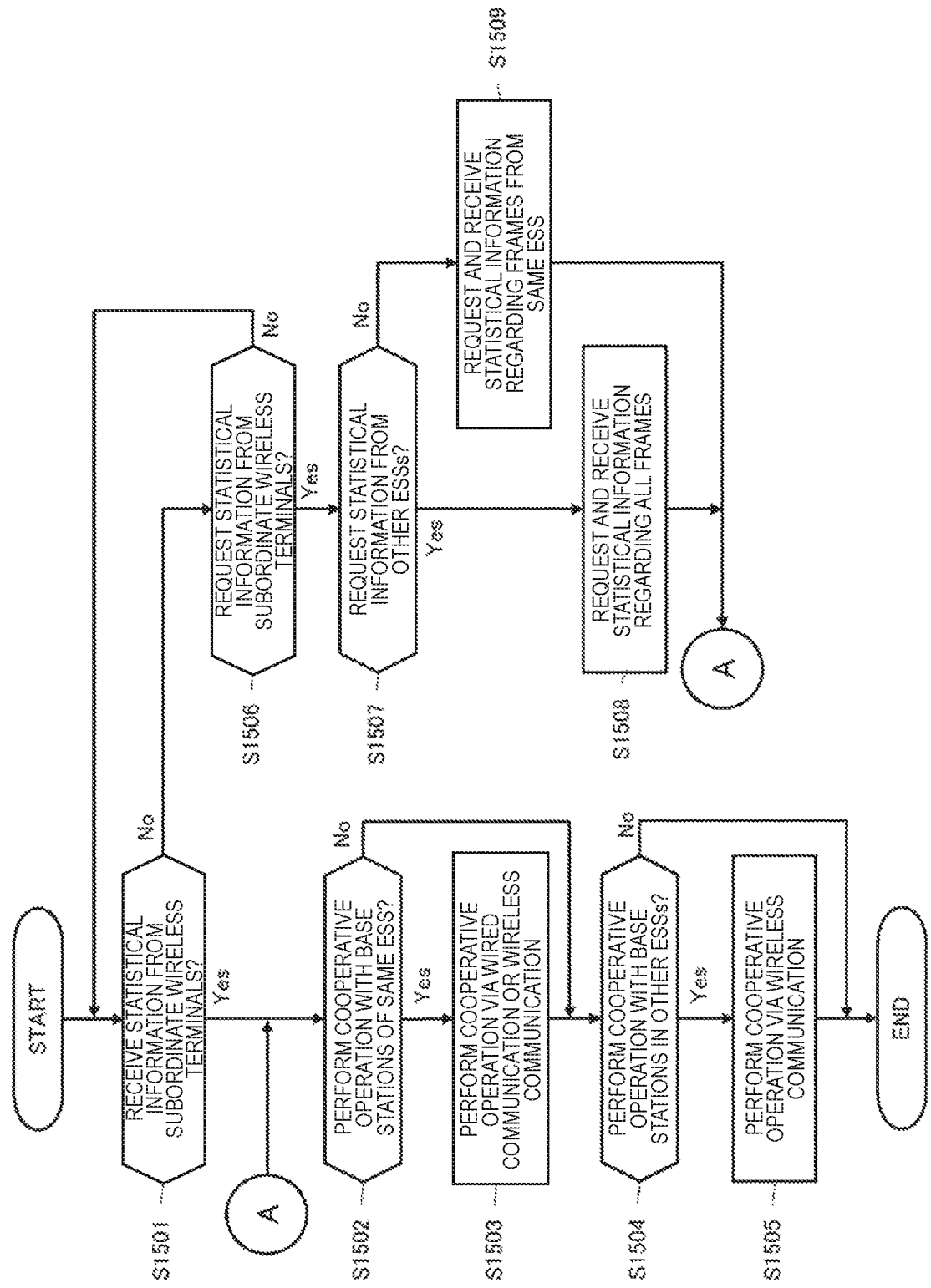
FIG. 15 is a flowchart illustrating processing procedure for a communication apparatus operating as an AP to collect statistical information from subordinate STAs and perform cooperative operation with other APs.

FIG. 15 illustrates processing procedure in a form of a flowchart, for the communication apparatus operating as the AP to collect statistical information from the subordinate STAs (belonging to the own BSS) and perform cooperative operation with other APs inside and outside the ESS. It is assumed that the illustrated processing procedure is executed mainly at the data processing unit 201 within the communication apparatus 200 illustrated in, for example, FIG. 2.

In the case where the AP does not receive statistical information from the subordinate STAs (step S1501: No), the AP checks whether to request the subordinate STAs to transmit the statistical information (Statistics Report) (step S1506).

Further, in the case where the AP requests the subordinate STAs to transmit the statistical information (Statistics Report) (step S1506: Yes), the AP further checks whether to request statistical information from ESSs other than the ESS including the own BSS (step S1507).

Then, in the case where the AP requests statistical information from ESSs other than the ESS including the own BSS (step S1507: Yes), the AP requests statistical information regarding all the arrival frames to the subordinate STAs and receives the statistical information (step S1508). Further, in the case where the AP does not request statistical information from ESSs other than the ESS including the own BSS (step S1507: No), the AP requests statistical information regarding only the arrival frames from the ESS including the own BSS to the subordinate STAs and receives the statistical information (step S1509).

In this manner, the AP can collect statistical information from the subordinate STAs. Then, in the case where cooperative operation is performed between the APs within the ESS including the own BSS (step S1502: Yes), the AP performs cooperative operation with other APs on the same ESS on the basis of the statistical information from the ESS to which the own AP belongs via wired communication constituting the ESS or via a frame such as Public Action Frame which can be communicated in a wireless manner and a communication scheme (step S1503).

Further, in the case where cooperative operation with APs of ESSs other than the ESS including the own BSS is performed (step S1504: Yes), the AP performs cooperative operation with APs on the other ESSs on the basis of the statistical information from the ESS to which the own AP belongs via a frame which can be communicated between the APs in a wireless manner and a communication scheme (step S1505).

INDUSTRIAL APPLICABILITY

The technology disclosed in the present specification has been described in detail above with reference to the specific embodiment. However, it will be obvious to those skilled in the art that modification and replacement of the embodiment can be made without departing from the scope of the technology disclosed in the present specification.

The technology disclosed in the present specification can be suitably applied to, for example, a wireless LAN system which complies with IEEE 801.11ax. Further, the technology disclosed in the present specification can be also applied to a network based on various wireless standards, in which a plurality of BSSs constitutes an upper ESS, and a signal including information for identifying the BSS is transmitted and received.

In short, the technology disclosed in the present specification has been described in an illustrative form, and the description of the present specification should not be interpreted in a limited manner. The claims should be taken into account to judge the gist of the technology disclosed in the present specification.

Additionally, the present technology may also be configured as below.

(1)

A communication apparatus that transmits a frame in which a first identifier regarding a first network group to which an own communication apparatus belongs and a second identifier regarding a second network group to which the first network group belongs are stored.

(2)

The communication apparatus according to (1), in which the communication apparatus stores the first identifier and the second identifier in a physical header of the frame, and performs transmission.

(3)

The communication apparatus according to (2), in which the communication apparatus also stores the second identifier within a signal region in the physical header, in which the first identifier is stored, and performs transmission.

(4)

The communication apparatus according to (3), in which the communication apparatus stores the second identifier in a region which is newly added within the signal region, and performs transmission.

(5)

The communication apparatus according to (3), in which the communication apparatus stores the second identifier in an existing region for storing other information within the signal region, and performs transmission.

(6)

The communication apparatus according to (5), in which whether or not the second identifier is stored in the existing region is indicated within the signal region.

(7)

The communication apparatus according to any of (5) or (6), in which, when it is necessary to make a notification of the second identifier, the communication apparatus stores the second identifier within an existing region for storing other information within the signal region, and performs transmission.

(8)

The communication apparatus according to (2), in which the communication apparatus stores the second identifier in a second signal region within the physical header, and performs transmission, the second signal region being different from a signal region in which the first identifier is stored and being newly added.

(9)

The communication apparatus according to (1), in which the communication apparatus stores the first identifier in a physical header of the frame, stores the second identifier in a region after the physical header, and performs transmission, the region being able to be decoded independently of a payload region.

(10)

The communication apparatus according to (1), in which the communication apparatus stores the first identifier in a physical header of the frame, stores the second identifier in a payload region, and performs transmission.

(11)

The communication apparatus according to any of (1) to (10), in which extension of the first identifier is made possible by storing part of the first identifier in part of a region for storing the second identifier.

(12)

The communication apparatus according to (11), in which the communication apparatus also transmits information for making a notification that the extension is performed.

(13)

The communication apparatus according to (12), in which the communication apparatus makes the notification in a region different from the region in which the first identifier is stored and the region in which the second identifier is stored.

(14)

The communication apparatus according to (12), in which the communication apparatus makes the notification within the region in which the second identifier is stored.

(15)

The communication apparatus according to any of (11) to (14), in which the communication apparatus performs the extension on the basis of the number of surrounding first network groups.

(16)

The communication apparatus according to any of (11) to (15), in which the communication apparatus confirms whether or not to perform the extension to a communication apparatus belonging to another first network group belonging to the second network group.

(17)

A communication apparatus that stores information regarding a received frame in which a first identifier regarding a first network group and a second identifier regarding a second network group to which the first network group belongs are described, in accordance with the first identifier or the second identifier.

(18)

The communication apparatus according to (17), in which the communication apparatus transmits the stored information in accordance with the first identifier or the second identifier.

(19)

A communication apparatus that receives from a subordinate wireless terminal information regarding a received frame in which a first identifier regarding a first network group and a second identifier regarding a second network group to which the first network group belongs are described, in accordance with the first identifier or the second identifier.

(20)

The communication apparatus according to (19), in which the communication apparatus receives from the wireless terminal information also including the information associated with a first identifier regarding a first network group included in a second network group to which the own communication apparatus belongs or the information associated with a second network group to which the own communication apparatus does not belong.

(21)

The communication apparatus according to any of (19) or (20), in which the communication apparatus performs cooperative operation with at least one of a communication apparatus within another first network group included in a second network group to which an own communication apparatus belongs or a communication apparatus within a second network group to which the own communication apparatus does not belong, on the basis of the information received from the wireless terminal.

(22)

A communication method including: a step of transmitting a frame in which a first identifier regarding a first network group to which an own communication apparatus belongs and a second identifier regarding a second network group to which the first network group belongs are stored.

(23)

A communication method including: a step of storing information regarding a received frame in which a first identifier regarding a first network group and a second identifier regarding a second network group to which the first network group belongs are described, in accordance with the first identifier or the second identifier.

(24)

A communication method including: a step of receiving from a subordinate wireless terminal information regarding a received frame in which a first identifier regarding a first network group and a second identifier regarding a second network group to which the first network group belongs are described, in accordance with the first identifier or the second identifier.

REFERENCE SIGNS LIST 200 communication apparatus
201 data processing unit
202 control unit
203 communication unit
204 power supply unit
211 modulating/demodulating unit
212 spatial signal processing unit
213 channel estimating unit
214 wireless interface unit
215 amplifier unit
216 antenna

The invention claimed is:

1. A communication apparatus, comprising:
a processor configured to:
store a first identifier and a second identifier in a frame, wherein
the first identifier is stored in a physical header of the frame,
the second identifier is stored in a region after the physical header, and
the region is decodable independently of a payload region; and
control transmission of the frame in which the first identifier and the second identifier are stored, wherein
the first identifier identifies a first network group,
the communication apparatus belongs to the first network group,
the second identifier identifies a second network group, and
the first network group belongs to the second network group.

2. The communication apparatus according to claim 1, the processor is further configured to store the first identifier and the second identifier in the physical header of the frame.

3. The communication apparatus according to claim 2, wherein the processor is further configured to store the second identifier in a first signal region in the physical header, in which the first identifier is stored.

4. The communication apparatus according to claim 3, wherein the processor is further configured to store the second identifier in a region which is newly added in the first signal region.

5. The communication apparatus according to claim 3, wherein the processor is further configured to store the second identifier in an existing region in the first signal region.

6. The communication apparatus according to claim 5, wherein the first signal region indicates storage of the second identifier in the existing region.

7. The communication apparatus according to claim 5, wherein the processor is further configured to notify the second identifier based on storage of the second identifier in the existing region.

8. The communication apparatus according to claim 2, wherein
the processor is further configured to store the second identifier in a second signal region in the physical header, and
the second signal region is different from a first signal region in which the first identifier is stored.

9. The communication apparatus according to claim 1, wherein the processor is further configured to extend the first identifier based on storage of a part of the first identifier in part of a region that stores the second identifier.

10. The communication apparatus according to claim 9, wherein the processor is further configured to control transmission of information for generation of a notification that indicates the extension.

11. The communication apparatus according to claim 9, wherein the extension of the first identifier is based on a number of first network groups that surrounds the first network group.

12. A communication apparatus, comprising:
a memory configured to store information regarding a received frame in which a first identifier and a second identifier are described, wherein
the information regarding the received frame is stored in accordance with one of the first identifier or the second identifier,
the first identifier identifies a first network group,
the second identifier identifies a second network group,
the first network group belongs to the second network group,
the first identifier is stored in a physical header of the received frame,
the second identifier is stored in a region after the physical header, and
the region is decodable independently of a payload region.

13. The communication apparatus according to claim 12, further comprising a processor configured to control transmission of the stored information of the received frame in accordance with the one of the first identifier or the second identifier.

14. A communication apparatus, comprising:
a processor configured to control reception of, from a subordinate wireless terminal, information regarding a received frame in which a first identifier and a second identifier are described, wherein
the reception of the information regarding the received frame is in accordance with one of the first identifier or the second identifier,
the first identifier identifies a first network group, the second identifier identifies a second network group, the first network group belongs to the second network group, the first identifier is stored in a physical header of the received frame, the second identifier is stored in a region after the physical header, and the region is decodable independently of a payload region.

15. The communication apparatus according to claim 14, wherein the processor is further configured to execute, based on the information received from the subordinate wireless terminal, cooperative operation with at least one of:
a first communication apparatus of at least one of a plurality of first network groups included in the second network group, wherein the communication apparatus belongs to the at least one of the plurality of first network groups, or
a second communication apparatus within the second network group to which the communication apparatus does not belong.

16. A communication method, comprising:
in a communication apparatus:
storing a first identifier and a second identifier in a frame, wherein
the first identifier is stored in a physical header of the frame,
the second identifier is stored in a region after the physical header, and
the region is decodable independently of a payload region; and
controlling transmission of the frame in which the first identifier and the second identifier are stored, wherein
the first identifier identifies a first network group, wherein the communication apparatus belongs to the first network group,
the second identifier identifies a second network group, and
the first network group belongs to the second network group.

17. A communication method, comprising:
in a communication apparatus:
storing information regarding a received frame in which a first identifier and a second identifier are described, wherein
the information regarding the received frame is stored in accordance with one of the first identifier or the second identifier,
the first identifier identifies a first network group,
the second identifier identifies a second network group,
the first network group belongs to the second network group,
the first identifier is stored in a physical header of the received frame,
the second identifier is stored in a region after the physical header, and
the region is decodable independently of a payload region.

18. A communication method, comprising:
in a communication apparatus:
controlling reception of, from a subordinate wireless terminal, information regarding a received frame in which a first identifier and a second identifier are described, wherein
the reception of the information regarding the received frame is in accordance with one of the first identifier or the second identifier,
the first identifier identifies a first network group,
the second identifier identifies a second network group,
the first network group belongs to the second network group,
the first identifier is stored in a physical header of the received frame,
the second identifier is stored in a region after the physical header, and
the region is decodable independently of a payload region.

19. A communication apparatus, comprising:
a processor configured to:
store a first identifier and a second identifier in a frame, wherein
the first identifier is stored in a physical header of the frame,
the second identifier is stored in a payload region; and
control transmission of the frame in which the first identifier and the second identifier are stored, wherein
the first identifier identifies a first network group,
the communication apparatus belongs to the first network group,
the second identifier identifies a second network group, and
the first network group belongs to the second network group.

* * * * *